Nov. 10, 1970 C. W. EHRMAN 3,540,012
CRT DISPLAY EDITING CIRCUIT
Filed Dec. 26, 1967 6 Sheets-Sheet 1

INVENTOR
CARL W. EHRMAN
BY Alfred E Hall
ATTORNEY

Nov. 10, 1970 C. W. EHRMAN 3,540,012

CRT DISPLAY EDITING CIRCUIT

Filed Dec. 26, 1967 6 Sheets-Sheet 2

Fig. 5

START $L_6C_5 \longrightarrow$ ELR
$L_3C_1 \longrightarrow$ CAR
CLEAR $\longrightarrow$ ZR
CAR $\longrightarrow$ I/O SR

| | COL 1 | COL 2 | ------ | COL 5 |
|---|---|---|---|---|
| LINE 3 | $L_3C_1$ from I/O SR $\longrightarrow$ SR<br>$L_3C_1$ from M $\longrightarrow$ CR<br>Compare: $L_3 \neq$ L.L.<br>Add BR + SR = $L_4C_1 \longrightarrow$ I/O SR<br>ZR (O) $\longrightarrow$ M ($L_3C_1$)<br>$L_3C_1$ from CR $\longrightarrow$ ZR | $L_3C_2$ from I/O SR $\longrightarrow$ SR<br>$L_3C_2$ from M $\longrightarrow$ CR<br>Compare: $L_3 \neq$ L.L.<br>Add BR + SR = $L_4C_2 \longrightarrow$ I/O SR<br>ZR (O) $\longrightarrow$ M ($L_3C_2$)<br>$L_3C_2$ from CR $\longrightarrow$ ZR | ------ | $L_3C_5$ from I/O SR $\longrightarrow$ SR<br>$L_3C_5$ from M $\longrightarrow$ CR<br>Compare: $L_3 \neq$ L.L.<br>Add BR+SR = $L_4C_5 \longrightarrow$ I/O SR<br>ZR (O) $\longrightarrow$ M ($L_3C_5$)<br>$L_3C_5$ from CR $\longrightarrow$ ZR |
| LINE 4 | $L_4C_1$ from I/O SR $\longrightarrow$ SR<br>$L_4C_1$ from M $\longrightarrow$ CR<br>Compare: $L_4 \neq$ L.L.<br>Add BR+SR = $L_5C_1 \longrightarrow$ I/O SR<br>ZR ($L_3C_1$) $\longrightarrow$ M ($L_4C_1$)<br>$L_4C_1$ from CR $\longrightarrow$ ZR | $L_4C_2$ from I/O SR $\longrightarrow$ SR<br>$L_4C_2$ from M $\longrightarrow$ CR<br>Compare: $L_4 \neq$ L.L.<br>Add BR + SR = $L_5C_2 \longrightarrow$ I/O SR<br>ZR ($L_3C_2$) $\longrightarrow$ M ($L_4C_2$)<br>$L_4C_2$ from CR $\longrightarrow$ ZR | ------ | $L_4C_5$ from I/O SR $\longrightarrow$ SR<br>$L_4C_5$ from M $\longrightarrow$ CR<br>Compare: $L_4 \neq$ L. L.<br>Add BR + SR = $L_5C_5 \longrightarrow$ I/O SR<br>ZR ($L_3C_5$) $\longrightarrow$ M ($L_4C_5$)<br>$L_4C_5$ from CR $\longrightarrow$ ZR |
| ¦ | ¦ | ¦ | | ¦ |
| LINE 6 | $L_6C_1$ from I/O SR $\longrightarrow$ SR<br>$L_6C_1$ from M $\longrightarrow$ CR<br>Compare: $L_6$ = L.L., $C_1 \neq$ L.C.<br>CAR ($L_3C_1$) + 1 = $L_3C_2 \longrightarrow$ I/O SR<br>ZR ($L_5C_1$) $\longrightarrow$ M ($L_6C_1$)<br>CLEAR ZR | $L_6C_2$ from I/O SR $\longrightarrow$ SR<br>$L_6C_2$ from M $\longrightarrow$ CR<br>Compare: $L_6$ = L.L., $C_2 \neq$ L.C.<br>CAR ($L_3C_2$) + 1 = $L_3C_3 \longrightarrow$ I/O SR<br>ZR ($L_5C_2$) $\longrightarrow$ M ($L_6C_2$)<br>CLEAR ZR | ------ | $L_6C_5$ from I/O SR $\longrightarrow$ SR<br>$L_6C_5$ from M $\longrightarrow$ CR<br>Compare: $L_6C_5$ = L.L. + L.C.<br><br>ZR ($L_5C_5$) $\longrightarrow$ M ($L_6C_5$)<br>END |

Nov. 10, 1970 C. W. EHRMAN 3,540,012

CRT DISPLAY EDITING CIRCUIT

Filed Dec. 26, 1967 6 Sheets-Sheet 4

Fig. 8

START Load $L_6C_5 \rightarrow$ I/O SR
Load BR
Load $L_3C_1$

| | COL 5 | COL 4 | ----- | COL 1 |
|---|---|---|---|---|
| LINE 6 | $L_6C_5$ from I/O SR $\rightarrow$ SR<br>$L_6C_5$ from M $\rightarrow$ CR<br>Compare $L_6 \neq$ F.L. $(L_3)$<br>Sub: SR−BR $= L_5C_5 \rightarrow$ I/O SR<br>ZR(O) $\rightarrow$ M$(L_6C_5)$<br>$L_6C_5$ from CR $\rightarrow$ ZR | $L_6C_4$ from I/O SR $\rightarrow$ SR<br>$L_6C_4$ from M $\rightarrow$ CR<br>Compare $L_6 \neq$ F.L. $(L_3)$<br>Sub: SR−BR $= L_5C_4 \rightarrow$ I/O SR<br>ZR(O) $\rightarrow$ M $(L_6C_4)$<br>$L_6C_4$ from CR $\rightarrow$ ZR | ----- | $L_6C_1$ from I/O SR $\rightarrow$ SR<br>$L_6C_1$ from M $\rightarrow$ CR<br>Compare $L_6 \neq$ F.L. $(L_3)$<br>Sub: SR−BR $= L_5C_1 \rightarrow$ I/O SR<br>ZR(O) $\rightarrow$ M$(L_6C_1)$<br>$L_6C_1$ from CR $\rightarrow$ ZR |
| LINE 5 | $L_5C_5$ from I/O SR $\rightarrow$ SR<br>$L_5C_5$ from M $\rightarrow$ CR<br>Compare $L_5 \neq$ F.L. $(L_3)$<br>Sub: SR−BR $= L_4C_5 \rightarrow$ I/O SR<br>ZR$(L_6C_5) \rightarrow$ M$(L_5C_5)$<br>$L_5C_5$ from CR $\rightarrow$ ZR | $L_5C_4$ from I/O SR $\rightarrow$ SR<br>$L_5C_4$ from M $\rightarrow$ CR<br>Compare $L_5 \neq$ F.L. $(L_3)$<br>Sub: SR−BR $= L_4C_4 \rightarrow$ I/O SR<br>ZR$(L_6C_4) \rightarrow$ M$(L_5C_4)$<br>$L_5C_4$ from CR $\rightarrow$ ZR | ----- | $L_5C_1$ from I/O SR $\rightarrow$ SR<br>$L_5C_1$ from M $\rightarrow$ CR<br>Compare $L_5 \neq$ F.L. $(L_3)$<br>Sub: SR−BR $= L_4C_1 \rightarrow$ I/O SR<br>ZR$(L_6C_1) \rightarrow$ M$(L_5C_1)$<br>$L_5C_1$ from CR $\rightarrow$ ZR |
| ¦ | ¦ | ¦ | | ¦ |
| LINE 3 | $L_3C_5$ from I/O SR $\rightarrow$ SR<br>$L_3C_5$ from M $\rightarrow$ CR<br>Compare $L_3 =$ F.L. $(L_3)$<br>$L_6C_5 - 1 = L_6C_4 \rightarrow$ I/O SR<br>ZR$(L_4C_5) \rightarrow$ M$(L_3C_5)$<br>CLR ZR | $L_3C_4$ from I/O SR $\rightarrow$ SR<br>$L_3C_4$ from M $\rightarrow$ CR<br>Compare $L_3 =$ F.L. $(L_3)$<br>$L_6C_4 - 1 = L_6C_3 \rightarrow$ I/O SR<br>ZR$(L_4C_4) \rightarrow$ M$(L_3C_4)$<br>CLR ZR | ----- | $L_3C_1$ from I/O SR $\rightarrow$ SR<br>$L_3C_1$ from M $\rightarrow$ CR<br>Compare $L_3C_1 =$ F.L. + F.C.<br><br>ZR$(L_4C_1) \rightarrow$ M$(L_3C_1)$<br>END |

1

3,540,012

CRT DISPLAY EDITING CIRCUIT

Carl W. Ehrman, Minneapolis, Minn., assignor to Sperry Rand Corporation, New York, N.Y., a corporation of Delaware Filed Dec. 26, 1967, Ser. No. 693,670
Int. Cl. G06f 3/14
U.S. Cl. 340—172.5 4 Claims

ABSTRACT OF THE DISCLOSURE

In a CRT display unit having characters displayed in lines and columns, an editing circuit for enabling an operator to select a window of characters on the display having selectively variable line and column boundaries and causing predetermined ones of the lines of characters in the window to be shifted upward or downward one or more lines.

BACKGROUND OF THE INVENTION

Cathode ray tube display systems are assuming an ever increasing role in a variety of applications including computer related uses. Generally speaking, these display systems can be controlled either by computers or human operators. From the operator standpoint, a keyboard is provided which is similar to the standard typewriter keyboard. As the operator types, the alphanumeric characters are drawn or "painted" on the cathode ray tube screen by the display system.

It will be obvious that some editing features must be provided in order to allow the operator to correct mistakes and errors. In commonly assigned, copending application Ser. No. 436,174, filed Mar. 1, 1965 and entitled "Digital Data Cathode Ray Tube Display Systems" (now Pat. 3,466,645) a display system is disclosed which includes some of the necessary editing features such as "character insert" and "character delete". In the "character insert" mode of operation, the operator can position an indicator or cursor over the alphanumeric character which should be moved one position to the right in order to make room for the insertion of an omitted alphanumeric character. When a "character insert key" is depressed, all of the characters following the selected character, as well as the selected character, move one position to the right thus making room for the omitted character.

In like manner, if an error or mistake is made and one alphanumeric character too many is inserted in a line, it is desirable to be able to remove or delete that character and allow all those following it to move one position to the left. This is accomplished in like manner as the "character insert" function. First, the cursor is positioned by the operator over the character which is to be deleted and then the "character delete" key is depressed. That character disappears and all subsequent characters move one position to the left to fill the vacant spot that is left.

While the above functions are necessary and desirable, it will be recognized that there are occasions when it will be necessary to insert or delete or shift to a new position entire lines of information.

SUMMARY

The present invention provides circuitry for accomplishing the above mentioned line insert or delete or shift functions. Regardless of which function is to be performed, the operator must first select the "window" of characters in which one line is to be inserted or deleted or all or part of which are to be shifted. This is accomplished by first positioning the visual indicator or cursor

2 over the character at the intersection of the last column and the last line in the "window." An END LIMIT key is depressed which stores the address of the last line and the last column in an END LIMIT register (ELR). The cursor is then positioned over the character at the intersection of thefirst column and the first line in the "window." This address is stored in the CURSOR ADDRESS REGISTER (CAR) since the line and column address of the cursor is continuously stored in the CAR.

The operator at this point may wait an indefinite period of time before proceeding with the desired operation. When he is ready to proceed with a LINE INSERT operation, he depresses the LINE INSERT key. This causes the data in the memory at the location corresponding to the intersection of the first column and the first line of the window, the cursor location, to be read out to a C-REGISTER (CR) and zeroes to be stored at that location in memory. Depressing the LINE INSERT key also causes a bias value to be stored in a BIAS REGISTER (BR) which, when added to the contents of the CAR register causes the operations to move to a predetermined succeeding line in the same column depending upon the value in the BR. At this point, the contents of this line are read out of the memory and the contents of the first line stored therein. With the proper value therein, repetition of the foregoing causes the data in each line of the first column in the "window" to successfully shift downward one line until the last line in the "window" is reached. At that time, a count of 1 unit is added to the value in the CAR which causes the accessible memory address to move to the next column of the first line of the "window." The process is then repeated again with each line of the next column being successively moved downward until the last line of the "window" is reached. This sequence is repeated for each of the remaining columns. When the last line of the last column in the "window" is reached, the LINE INSERT function is terminated. The result is that the last line of characters in the window have been deleted, each of the other lines have been moved downward one line and a space is now available where the first line of the "window" was originally located. A new line can now be written at that location.

For the LINE DELETE function, the "window" of characters is selected as explained above for the LINE INSERT function. Thus, the cursor is positioned over the character at the intersection of the last column and the last line in the "window." The END LIMIT key is depressed which stores the address of that character in the ELR register. The cursor is then positioned over the character at the intersection of the first column and the first line in the "window" and this address is stored in the CAR register.

When the LINE DELETE key is depressed, the data in the memory at the location corresponding to the character at the intersection of the last line and the last column of the "window" is read out of the memory to the CR register and zeroes are stored at that location in memory. Further, depressing the LINE DELETE key causes a bias value to be stored in the BR register. This value is subtracted from the value stored in the ELR register which causes the CRT electron beam to move to the preceding line in the same column. The data at that location is then read out from the Memory and the data from the previous location which was stored in the CR register is placed in Memory at that location. Repetition of the foregoing steps thus shifts all characters of the last column of the "window" upward until the first line of the "window" is reached. The data in each column of the first line of the "window" is not shifted upward but is destroyed. Also, at this time, a count of 1 unit is subtracted from the data in the ELR register representing the column portion of the beam position causing the beam to move to the next to the last column in the last line of the "window." All the data in each line of this column is shifted upward as explained for the last column. This sequence is repeated until the first column of the window is reached. All the data in this column is again shifted upward one line until the first line of the "window" is reached. At this time the LINE DELETE function is terminated.

It will be seen from the above discussion that the BR register determines how many spaces the lines will be shifted upward or downward. If, for example, an arbitrary 10 units in the BR register causes a line to shift up or down one line, then 20 units would cause every other line to shift up or down two lines, 30 units would cause every third line to shift up or down three lines, and so forth. This could be a very useful function in interposing lines of data or numerical information.

Thus, the present invention provides a CRT display system with the capabilities of inserting or deleting an entire line of information from a selected "window" of characters shown on the face of a cathode ray tube. The LINE INSERT function, if the bias value in the BR register is proper, causes the data in each line of each column of the "window," starting with the first line and the first column, to be sequentially shifted downward one line until the data in the next to the last line in the selected window is stored in the last line of the "window." As stated earlier, changing the value in the BR register will cause particular lines to be advanced downward a particular number of lines.

In like manner, the LINE DELETE function causes the data in each line of each column, starting with the last line of the last column in the "window," to be sequentially shifted upward one line until the data in the second line of the last column is stored in the first line of the same column thus destroying and deleting the original information in the first line of the "window." This operation is sequentially repeated for each of the columns from the last to the first until the data in the second line of column 1 in the "window' is stored in the first line of column 1. Since the cursor will be located at this point, the LINE DELETE function is terminated.

Thus it is an object of this invention to provide a cathode ray tube display system with provisions for enabling an operator to select a "window" of characters on the display screen having selectively variable line and column boundaries and causing predetermined ones of the lines of characters in the "window" to be shifted upwards or downwards one or more lines.

It is a further object of this invention to provide a line insert or delete circuit for a CRT system having $n$ lines and $m$ columns of characters wherein a "window" of $i$ lines and $j$ columns may be selected in which the lines in an individual column are sequentially shifted upward or downward from the top or bottom of said "window" and wherein each column of lines is sequentially shifted in the foregoing manner beginning with the first column in the "window" during the line insert process and beginning with the last column during the line delete process.

BRIEF DESCRIPTION OF THE DRAWINGS

These and other more detailed and specific objects will be disclosed in the course of the following specification, reference being had to the accompanying drawings, in which:

FIG. 5 shows the detailed steps of a LINE INSERT operation;

FIG. 8 shows the detailed steps of a LINE DELETE operation.

DESCRIPTION OF THE PREFERRED EMBODIMENT

The present inventive circuits for the CRT display editing features necessarily assume a display system wherein the face of the display is divided into a rectangular coordinate grid of $n$ rows and $m$ columns, where each column and row intersection is a unique display position. Further, the assumed system includes a Memory comprised of a number of addresses, the number equalling the number of display positions and so organized that each Memory address corresponds to a respective one, and only one, of the display positions.

Figure 1:
FIG. 1 shows the relationship of the I/O and the PAINT cycles of a CRT display system.

Major timing includes an I/O cycle and a PAINT cycle as shown in FIG. 1 and discussed in detail in the above identified copending application.

In operation, the memory addresses are scanned sequentially during both the I/O and the PAINT cycles. A Cursor Address Register (CAR) stores data indicative of either the location on the CRT screen where the next new character will appear or the location in memory where the next new character will be stored. Thus, during the PAINT cycle, the data stored in the memory is employed to generate the various characters specified by the particular bit patterns. To display a character, the binary bit configuration defining that character is first stored in the Memory during the WRITE portion of the I/O cycle at an address corresponding to the position at which it is to be displayed on the CRT screen. Notice in FIG. 1 that both the I/O cycle and the PAINT cycle are divided into READ and WRITE cycles. During the PAINT cycle, as the Memory is scanned, the READ/WRITE cycle for each address is executed. Assuming that the bit configuration at any particular address represents a displayable character, the READ portion gates the data to the Character Generators where it is operated upon to trace the character on the viewing media. The WRITE or restore portion of the PAINT cycle returns the data to memory so that the sequence may be repeated during the following PAINT cycle when the memory is scanned.

Figure 2:
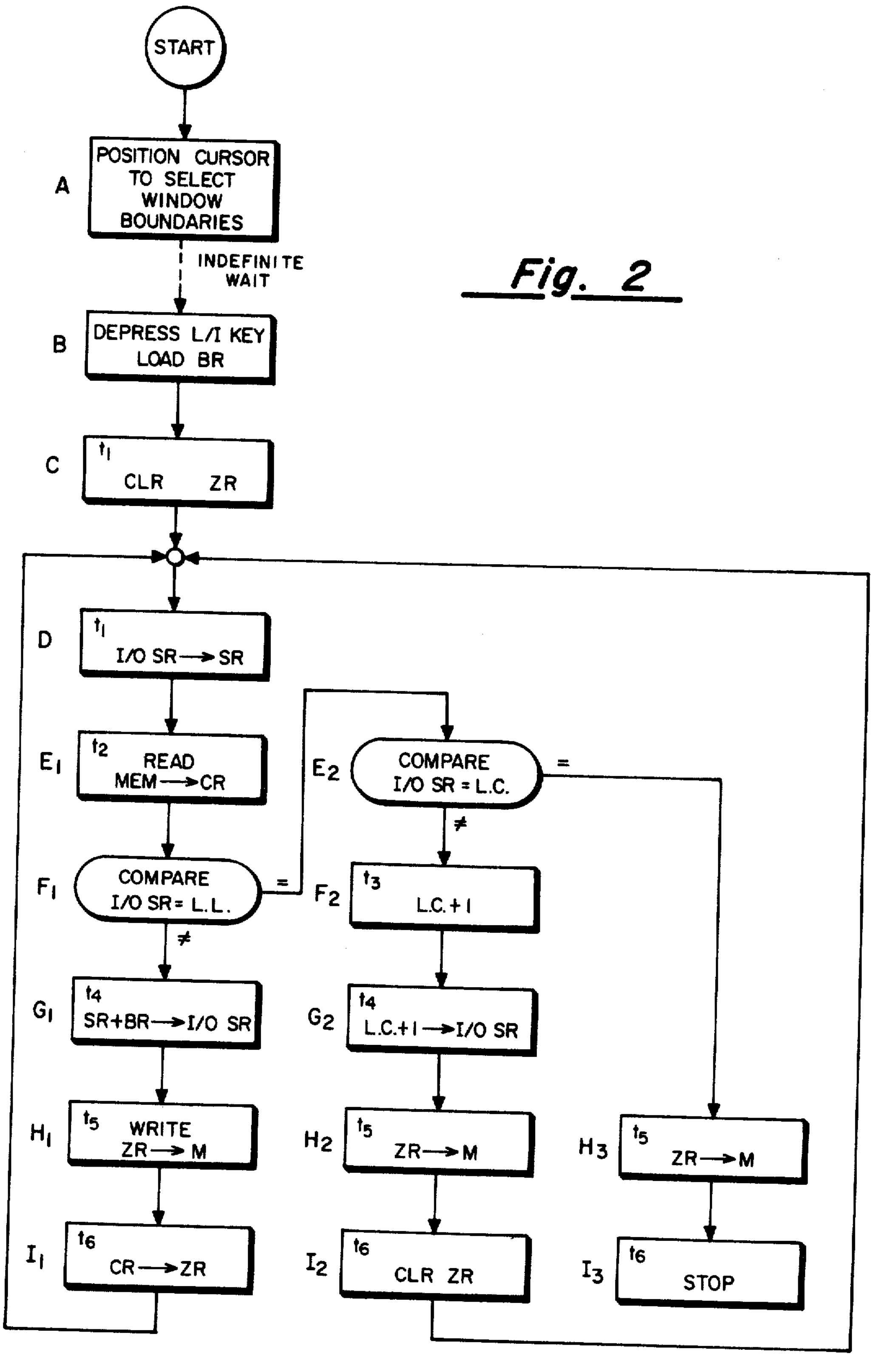
FIG. 2 is a flow diagram for the LINE INSERT operation of the present invention.

With the above in mind, consider FIG. 2 which is a flow diagram of the LINE INSERT function. To start the operation, the operator must first select the boundaries of the "window." This is accomplished by positioning the cursor as described above. (The manner in which the cursor is moved and the electronic circuits employed are described in the above identified copending application.) When this has been accomplished, the address of the character at the intersection of the last line and the last column will have been stored in the END LIMIT REGISTER (ELR) and the address of the character at the intersection of the first line and the first column will have been stored in the CAR register. This is represented by block A in FIG. 2. At this point, an indefinite waiting period can lapse before the operation proceeds further.

When it is desired that the operation proceed, the LINE INSERT key is depressed. Depressing this key causes the contents of the CAR register to be transferred to the Input/Output Storage Register, (I/O SR). Further, a bias value is placed in the BIAS REGISTER (BR) at this time. As explained earlier, the value placed in this register determines the number of spaces a particular line or lines will be shifted. Assume for purposes of this discussion that the value stored in the BR is proper to cause the lines in the selected "window" to be shifted one line or space. This operation is represented by block B in FIG. 2.

Figure 3:
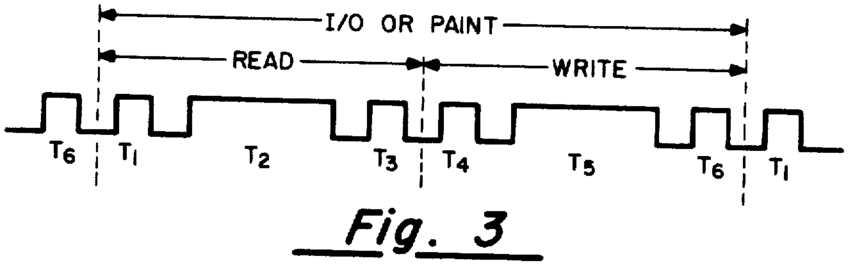
FIG. 3 shows the timing breakdown of an I/O or PAINT cycle.

The remainder of the flow chart shown in FIG. 2 will be explained with relation to timing pulses which are shown in FIG. 3. It should be pointed out that the timing pulses are shown for purposes of explanation and illustration only and thus they have no correspondence with the timing pulses shown in the above identified commonly assigned copending application although it is obvious that one skilled in the art could provide the timing of FIG. 3 from the clock generator disclosed in the above identified copending application. It will be noted in FIG. 3 that pulses $T_2$ and $T_5$ are longer in duration than the remaining pulses. This is the case because, during these times, data is read out of and into the Memory, respectively, and these pulses must be of sufficient duration to enable the READ or WRITE process to be completed.

Referring again to FIG. 2, it will be seen in block C that at time $T_1$ the Z-Register is CLEARED. At this same time, as shown in block D, the contents of the I/O SR are gated to the S-Register.

At time $T_2$, as shown in block $E_1$, the contents of the address in the Memory as specified by the S-Register are read out to the C-Register. This means that the data in the Memory representing the character over which the cursor is positioned, i.e. the character at the intersection of the first line and the first column of the "window," has been read out of the Memory and is now stored in the C-Register.

During the time that the Z-Register is being CLEARED and the data transferred from the I/O SR to the S-Register, the output portion of the I/O SH representing the line address is being compared with data representing the last line in the "window." This is shown in block $F_1$ of FIG. 2. This, in effect, is asking, "Is the data being read out of the Memory that data which represents the last line in the "window" of the column in question?" This information is needed because we wish to move to the first line of the next succeeding column in the "window" when we reach the last line of any particular column in question. The last line in the "window" may be, of course, the last line on the display screen or it may be the same line as the first line on the display screen. Further, the first line in the window may be the same as the last line in the window. If this is the case, however, in either the INSERT or DELETE operation this line would be deleted.

If the above comparison shows that the output of the I/O SR representing the line address is not equal to the last line of the "window," then the contents of the S-Register are added to the contents of the BR register. The value in the BR register, when added to the contents of the S-Register, will cause the operations to move downward one line. Thus, if the operations begin at line 1, column 1 ($L_1C_1$) of the "window," the data stored in the S-register will represent $L_1C_1$. When this value is added to the value stored in the BR register, the result will be equal to $L_2C_1$. This value, $L_2C_1$, is then transferred from the Adder to the I/O SR. This operation takes place at time $T_4$ as shown by block $G_1$ in FIG. 2.

At time $T_5$, the contents of the Z-register are transferred to the Memory at the address indicated by the data in the S-register. It will be remembered that block $E_1$ in FIG. 2 shows that the contents of the Memory at the address indicated by the S-register has been read out to the C-register. It will also be remembered that at time $T_1$, as shown by block C in FIG. 2, the Z-register was CLEARED, i.e. all zeroes were stored in the Z-register. Now, at time $T_5$, as shown by block $H_1$ in FIG. 2, the contents of the Z-register, i.e. the zeroes, are transferred to the address in Memory specified by the contents of the S-register.

Now, at time $T_6$, as shown by block $I_1$ in FIG. 2, the contents of the CR register, i.e. the data representing the character over which the cursor is last positioned at the start of the operation, are transferred from the C-register to the Z-register. The cycle is now ready to repeat.

What has happened as of this point is as follows. The address of the character in the first column and the first line in the "window" that is to be shifted downward is stored in the S-register and causes the data in the corresponding location in Memory to be read out to the C-register. The Z-register has been CLEARED and the zeroes therein are stored in Memory at the location from which the data has just been taken. The data in the S-register is then compared with data representing the last line in the "window" and, if it does not compare, a bias value from the BR register is added to the value in the S-register and the result temporarily stored in the I/O SR. The data that is stored in the C-register is transferred to the Z-register and the data in the I/O SR is transferred to the S-register and the cycle begins again. This time however the address that is read out of Memory is that of the character in the line immediately below where the operations are presently taking place.

Figure 4:
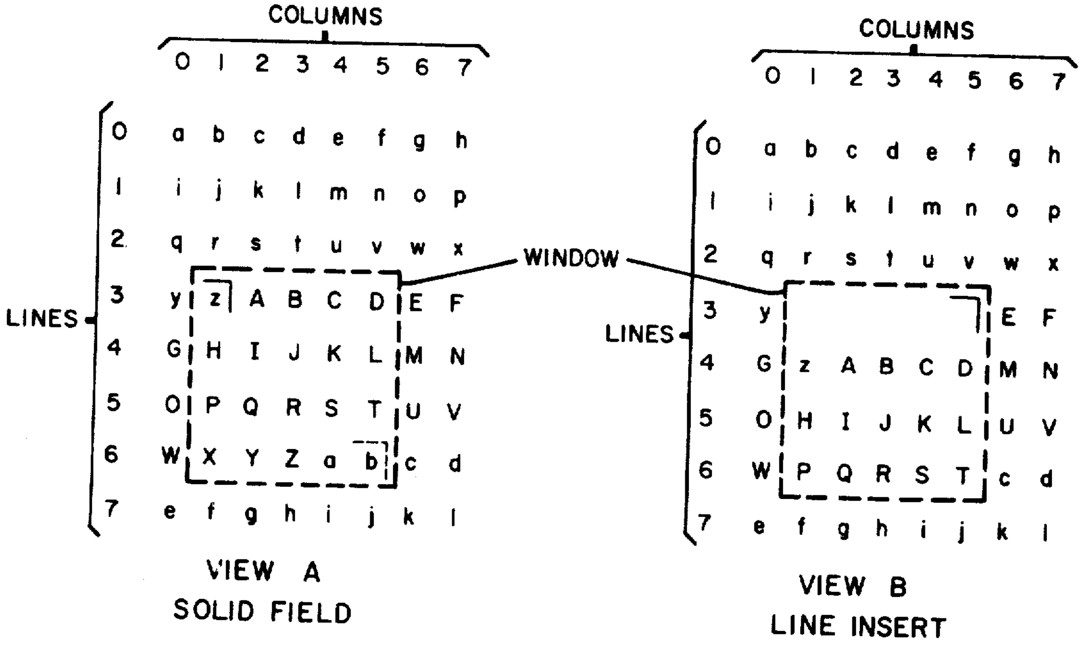
FIG. 4($a$) and 4($b$) represents a display field before and after a LINE INSERT operation.

Considering FIG. 4(*a*), assume that the displayed field on the CRT screen is as shown. Assume also that the "window" of characters to be selected by the operator is that shown by the dashed outline. It can be seen that the first and last lines of the "window" are lines 3 and 6 respectively while the first and last columns are columns 1 and 5 respectively. Thus, the portions of lines 3–5 between columns 1 and 5 inclusively are to be shifted downward one line to make room for a different line of characters to be inserted in line 3. Further, the characters in line 6, columns 1 through 5, are to be destroyed.

The cursor is first placed over the character *b* in line 6, column 5, and the END LIMIT key is depressed. This establishes data in the ELR register representing both the last line and the last column. The cursor is then positioned over the character *z* in line 3, column 1 and is left in this position. This establishes data in the CAR register representing the first line and the first column.

During the first cycle described above, the data representing the *z* is taken out of its location in Memory and held in the C-register while zeroes are stored in that location in Memory to produce a blank in that position as shown in FIG. 4(*b*). If this position is designated as $\mathbf{31}_8$, then the BR register adds $\mathbf{10}_8$ to the S-register in order to locate the position of the H which is at $\mathbf{41}_8$. The data representing the *z* which is stored temporarily in the C-register is transferred to the Z-register and the data in Memory at location $\mathbf{41}_8$ representing the H is now read out to the C-register. The data in the Z-register which represents the *z* is now returned to the Memory at location $\mathbf{41}_8$. Thus, the *z* has been shifted downward one line as shown in FIG. 4(*b*).

This cycle continues until such time as shown by block $F_1$ in FIG. 2 when the data in the I/O SR compares with the data representing the last line in the "window." At this time, the data in the I/O SR is also compared with the data representing the last column. If there is no comparison with the last column data, at time $T_3$, as shown by block $F_2$ in FIG. 2, one unit is added to the column address stored in the CAR register. This is to cause the operation to move to the next succeeding column, e.g. from column 1 to column 2. To accomplish this, at time $T_4$ the contents of the CAR register, which has now been incremented by one unit, is transferred to the I/O SR. The data in the Z-register which, in the example above and as shown in FIG. 4(*a*) and (*b*), would represent the "P" at $\mathbf{51}_8$ is transferred to the Memory at location $\mathbf{61}_8$ at time $T_5$. At time $T_6$, as shown in block $I_2$ of FIG. 2, the Z-register is CLEARED and the cycle is started over again. Thus, the data in the I/O SR, which has had the column data incremented by one unit, is transferred to the S-register at time $T_1$ as shown by block D and the cycle continues as discussed above.

This cycle continues for every line of each column until the last line of the last column in the window is reached. Then, at time $T_5$, the contents of the Z-register, which would be the data representing the character "T" in location $\mathbf{55}_8$ in FIG. 4(*a*), would be transferred to location $\mathbf{65}_8$ in the Memory which represents the location of the character *b* in FIG. 4(*a*). At that time, a signal is produced which stops the operation.

FIG. 4(*b*) shows the result of the LINE INSERT operation when it has been decided to insert a new line in the place of line 3 in the "window." It will be noted that within the "window," line 3 is shifted down to line 4, line 4 is shifted down to line 5, line 5 is shifted down to line 6 and line 6 is deleted thus leaving a space where line 3 originally was located. A new line can now be inserted in that location.

FIG. 5 shows the step-by-step operation of a LINE INSERT function based upon FIG. 4(*a*) and (*b*). Thus, as shown in FIG. 5, to start the operation, the Z-register must be CLEARED and the cursor first positioned over the character on the screen in location $L_6C_5$. The END LIMIT key is depressed which stores the data representing the last line and the last column in the "window." The cursor is then positioned over the character in location $L_3C_1$ and the data representing that location is stored in the CAR register. When the operation begins, the data stored in the CAR register is transferred to the I/O SR.

Going through the steps for the first column and the third line as shown in FIG. 5, the address $L_3C_1$ is transferred from the I/O SR to the S-register and is used to gate the data from that address in Memory to the C-register. At that time the data in the I/O SR representing the line $L_3$ is compared with the data in the LL register representing the last line in the "window" and, since they are not equal, the contents of the BR register is added to the contents of the S-register and the result, $L_4C_1$, is transferred to the I/O SR. The contents of the Z-register, all zeroes at this time since it has been cleared, is transferred to the Memory at the address in the S-register, $L_3C_1$. The contents of the C-register, $L_3C_1$, is then transferred to the Z-register and the cycle is ready to begin again.

Figure 6:
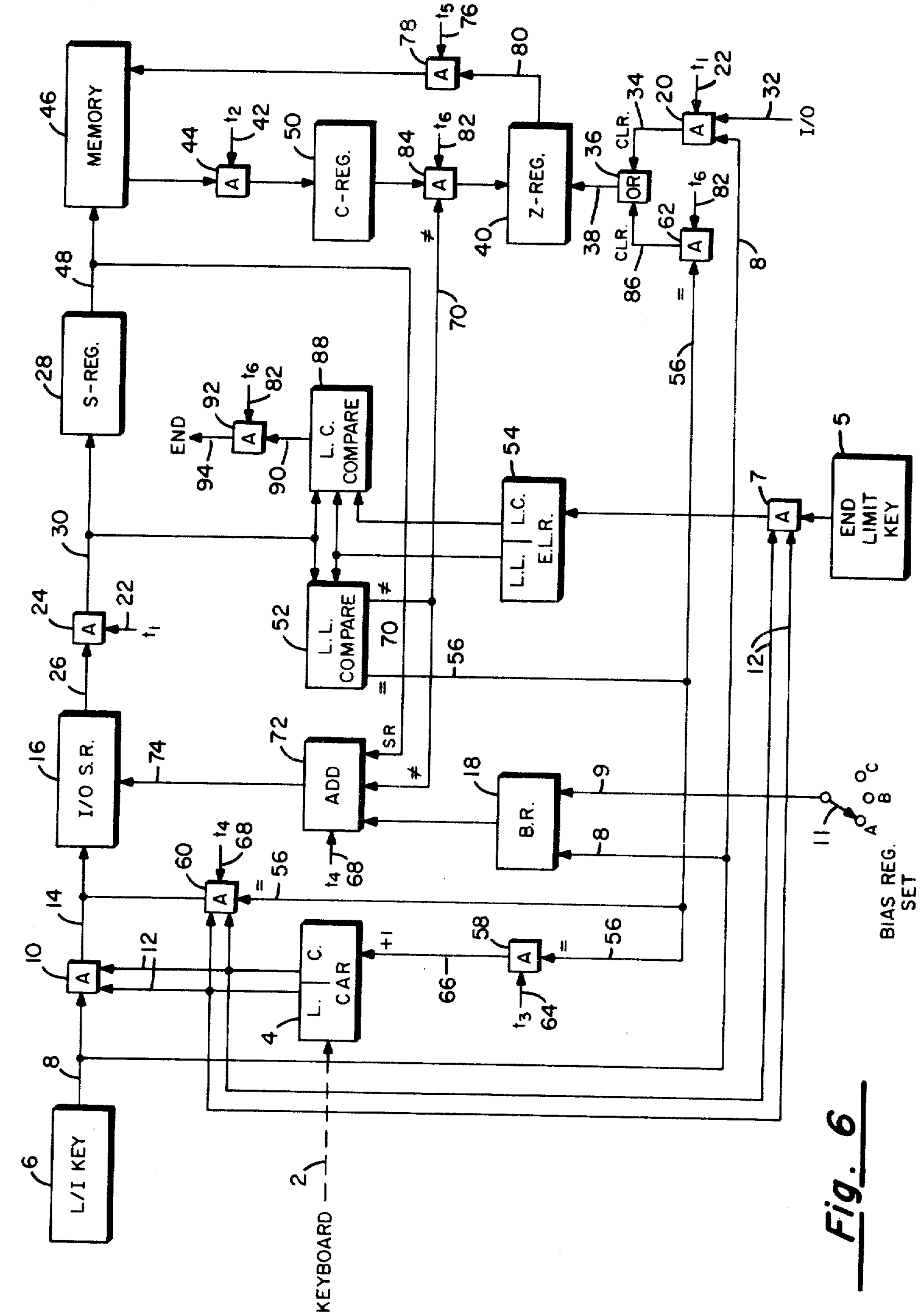
FIG. 6 shows the circuitry necessary to perform a LINE INSERT operation.

FIG. 6 is a block diagram of the present invention showing the circuits necessary for the LINE INSERT operation. When the operator positions the CURSOR over the character at the intersection of the last line and the last column of the "window," the manipulation of the keys which control the CURSOR movement, and represented by dashed line 2 in FIG. 6, causes the CURSOR address to be stored in the CAR register 4, all as is explained in the aforereferenced Pat. 3,466,645. When the END LIMIT key 5 is depressed, AND gate 7 is enabled and the address of the CURSOR is stored in the END LIMIT register 54 (ELR). Thus, this register stores the address of both the last line and the last column of the "window."

The CURSOR is then positioned over the character in the first line and the first column of the "window" and this address is again stored in the CAR register. When the LINE INSERT key 6 is depressed, an enabling signal is produced on line 8 which is coupled to AND gate 10 and enables the CURSOR address from the CAR register on line 12 to pass through AND gate 10 on line 14 to the I/O SR 16. The enabling signal on line 8 is also coupled to the BR register 18 and causes the bias value to be stored therein. The proper value to be stored in the BR register can be determined in many ways which are well known in the art and, therefore, for ease of illustration, is shown in FIG. 6 as line 9 which receives the proper signals from moveable arm 11 which can be positioned in either of positions A, B or C. The value to be stored in the BR register, then, depends upon the position of arm 11 on taps A, B or C.

Finally, the enabling signal on line 8 is also coupled as one enabling signal to AND gate 20.

At time $T_1$, a clock signal on line 22 is coupled as one enable to AND gate 24 which also receives the data signals from I/O SR 16 on line 26 and couples the data to S-register 28 via line 30. This clock signal, $T_1$, is also coupled to AND gate 20 along with the signal on line 32 indicating that I/O is being performed. The signal from the LINE INSERT key 6 on line 8 provides the final enable and AND gate 20 produces an output on line 34 which passes through OR gate 36 on line 38 and CLEARS the Z-register 40.

At time $T_2$, a clock signal on line 42 is coupled to AND gate 44 which causes the data in the Memory 46 at the address indicated by the output of the S-register 28 on line 48 to be stored in the C-register 50.

In the meantime, comparator 52 is comparing the data from ELR register 54 represented the last line in the "window" with the data from the I/O SR on line 30. If the signals compare, indicating that the last line has been reached, comparator 52 produces an output signal on line 56 which is coupled as one input to AND gates 58, 60 and 62.

At time $T_3$, AND gate 58 receives the clock pulse on line 64 and, with the signal on line 56 from comparator 52, produces an output on line 66 which causes the column address portion of the data in the CAR register 4 to be incremented by one unit, thus preparing the circuitry to operate on the data in the next column during the next cycle.

At time $T_4$, the clock pulse on line 68 is coupled to AND gate 60 where, along with the signal from the comparator on line 56, it gates the output of the CAR register 4 to the I/O SR 16 where the cycle begins again on the data in the next column.

Consider now the case where the comparator 52 produces an output signal on line 70 indicating that the output of the I/O SR 16 does not compare with the output of ELR register 54. This signal is coupled to ADDER 72 where it enables the addition of the data in the S-register 28 with the bias value stored in the BR register 18. The final enable to ADDER 72 is the $T_4$ clock signal on line 68. Thus, the output of the ADDER 72 on line 74 is coupled to I/O SR 16 and the cycle is continued in the same column.

At time $T_5$, regardless of whether or not the last line has been reached, the clock signal on line 76 is coupled to AND gate 78 where it enables the data stored in the Z-register 40 to be transferred via line 80 to the location in Memory designated by the data stored in the S-register 28.

At time $T_6$, if the last line has not been reached, the clock pulse on line 82 is coupled to AND gate 84 along with the signal from comparator 52 on line 70 and the contents of the C-register 50 is transferred to the Z-register 40.

If the last line in the "window" has been reached, then the clock pulse $T_6$ on line 82 is coupled to AND gate 62 along with the signal from the comparator 52 on line 56. AND gate 62 produces a CLEAR signal on line 86 which passes through OR gate 36 on line 38 and CLEARS the stages of Z-register 40.

Comparator 88 compares the output of the I/O SR with the data in ELR register 54 representing the last line (LL) as well the last column (LC). When such a comparison occurs, comparator 88 produces an output on line 90 which is coupled to AND gate 92 as one input. The other input to AND gate 92 is the $T_6$ clock pulse on line 82. When it occurs, AND gate 92 produces an output on line 94 which stops the operation of the circuit.

If the value in the BR register 18 causes the even numbered lines to be shifted and the number of lines in the selected array are odd or vice versa, then the last line is never reached and it would seem that no comparison could take place between the output of the I/O SR register 16 and the ELR register 54. If this were the case, the shifting operation would not stop. However, comparators, well known in the art such as that disclosed in Pat. No. 3,350,685, can be used to provide the necessary control signals to stop the operation when the two line addresses are equal or one is greater than the other.

Figure 7:
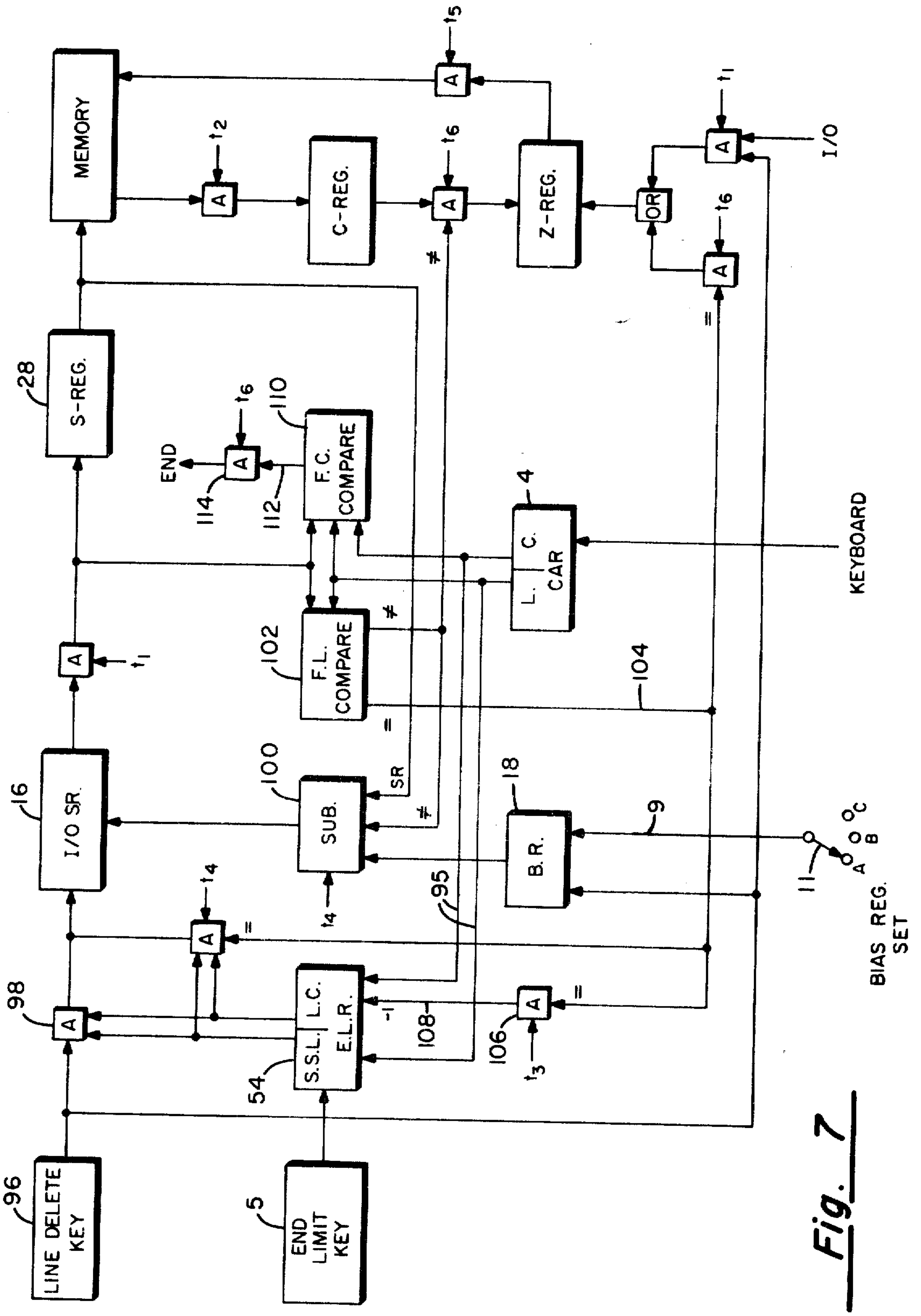
FIG. 7 shows the circuitry necessary to perform a LINE DELETE operation.

The LINE DELETE circuitry shown in FIG. 7 is very similar to the LINE INSERT circuitry shown in FIG. 6. The operation differs however in that it works somewhat in reverse of the LINE INSERT operation.

The CURSOR is again positioned over the character at the intersection of the last line and the last column of the "window" and the END LIMIT key 5 depressed. This stores the address of this character from the CAR register 4 on line 95 in the ELR register 54. Next the CURSOR is again positioned over the character at the intersection of the first line and the first column in the "window." This value is stored in the CAR register 4.

Note this time, however, that when the LINE DELETE key 96 is depressed, it is the output of the ELR register 54 that is transferred to the I/O SR 16. Thus, the operation, instead of starting with the character in the first line and the first column of the "window," starts with the character in the last line and the last column of the "window."

From this point, the operation proceeds as in the LINE INSERT operation with a few exceptions. First, instead of starting with the first column in the "window" and going down that column, the operation starts with the last column in the "window" and goes up that column. This means that instead of adding the value in the BR register 18 to the value in the S-register 28, it must be subtracted from it. Thus, in FIG. 7, the output of the BR register 18 and the S-register 28 are coupled to SUBTRACTOR 100 the output of which is coupled to the I/O SR as was the ADDER 72 in FIG. 6. Thus, the operation proceeds up the last column until it reaches the first line in the "window." Here a comparison must be made between the line address portion of the CAR register 4 and the output of the I/O SR. This comparison is made by comparator 102. If such a comparison exists, the output on line 104 is coupled to AND gate 106 which, at time $T_3$, produces an output signal on line 108 that causes one unit to be subtracted from the column address portion of the ELR register 54. This causes the operation to drop down to the next preceding column of the last line in the "window." Thus, the cycles continue until the operation reaches the first line of the first column in the "window."

At that time a comparison is made by comparator 110 between the line and column address stored in the CAR register 4 and the output of the I/O SR. Since a compare will be made, an output signal from comparator 110 will appear on line 112 which will pass through AND gate 114 at time $T_6$ thus causing the operation to cease.

The remainder of the circuit shown in FIG. 7 operates in exactly the same way as the circuit shown in FIG. 6 and described above.

A step-by-step operation of the circuit shown in FIG. 7 is shown in FIG. 8.

Thus, a novel circuit has been shown and described in which any predetermined number of lines shown on a cathode ray tube display screen can be shifted downward one line or more in order to make room to insert another line. Further, any selected line can be deleted and any predetermined number of lines below that line shifted upward one or more lines to fill up the space left by the deleted line.

What is claimd is:

1. In a CRT display unit having characters displayed in lines and columns, an editing circuit for enabling an operator to select an array of characters on the display having predetermined line and column boundaries and cusing predetermined lines of characters in the array to be shifted upward or downward one or more lines, said circuit comprising:

(a) means for selecting the intersection of one of said column boundaries with one of said line boundaries as a starting point and the intersection of the other of said column boundaries with the other of said line boundaries as an endpoint, (b) shifting means coupled to said selecting means for sequentially shifting each of said characters in successive columns of the array at least one character position beginning with said starting point and destroying data representing the last character in each column, and (c) means for inhibiting said shifting means when said endpoint is reached.

2. An editing circuit as in claim 1 wherein said shift circuit comprises:

(a) means coupled to said memory means for retrieving data from said memory means at the location determined by said data in said second register and for storing a blank therein, (b) a line address incrementing circuit coupled to said second register for cyclically incrementing the line address data stored therein by a predetermined amount whereby a succeeding location in the memory means is addressed, corresponding to a succeeding location along the column specified by the column address in said second register, and the data from said succeeding location retrieved and the retrieved data from the preceding line location stored therein, (c) a first comparator coupled to said first and second registers for comparing said incremented line address in said second register with data representing the last line of said array in said first register, (d) a column address incrementing circuit coupled to said second register and said comparator for cyclically incrementing said column address data in said second register when said line data compares whereby a succeeding location in memory is addressed corresponding to the location of the character at the intersection of the first line and the next succeeding column, and (e) a second comparator coupled to said first and second registers for comparing said incremented line address and column address data in said second register with said last line and last column address data in said first register and producing an output signal for disabling said shift circuits when both said line and column data compare.

3. In a cathode ray tube alphanumeric display unit of the type having characters displayed in lines and columns, and editing circuit for allowing an operator to select an array of characters on the display having predetermined line and column boundaries and causing predetermined lines of characters in the array to be shifted upward or downward one or more lines, said circuit comprising:

(a) a memory means for storing at addressable locations therein data representing said lines and said columns of characters;

(b) a first register for storing data representing a line and column address of a first character located in the array at a desired coordinate location on the face of said cathode ray tube;

(c) a second register for storing data representing a line and column address of a second character located in the array at a second desired coordinate location on the face of said cathode ray tube;

(d) a shift circuit coupled to said first and said second registers and to said memory circuit for shifting predetermined ones of said lines of characters in said selected array a predetermined number of spaces beginning with the character represented by the address data stored in said first register and ending at the character location at the address specified by the address data of said second register.

4. An editing circuit for a cathode ray tube display unit for enabling an operator to select a portion of the display screen defined by desired boundaries of lines and columns and causing predetermined lines of characters in the array to be shifted upward or downward one or more lines, said editing circuit comprising:

(a) a first means for storing the address of a character located at a first desired coordinate location for defining a first line and column boundary for the desired array;

(b) a second means for storing the address of a character located at a second desired coordinate location for defining a second line and column boundary, said first and second coordinate locations defining a diagonal of said array;

(c) memory means for storing at addressable locations therein data representing characters to be displayed;

(d) means including address incrementing means and memory addressing means for repeatedly reading out said data from the memory location specified by the address contained in said first means and for subsequently restoring said data into said memory means at the address contained in said first means as altered by said incrementing means; and comparing means coupled to said second means and to said memory addressing means for terminating the operation of said editing circuit when the contents of said second means become equal to the address contained in said memory addressing means.

References Cited

UNITED STATES PATENTS

| | | | |
|---|---|---|---|
| 3,248,705 | 4/1966 | Dammann et al. ---- | 340—172.5 |
| 3,346,853 | 10/1967 | Koster et al. ------- | 340—172.5 |

PAUL J. HENON, Primary Examiner

M. B. CHAPNICK, Assistant Examiner

U.S. Cl. X.R.

340—324